US007721096B2

(12) United States Patent
Chiasson et al.

(10) Patent No.: US 7,721,096 B2
(45) Date of Patent: May 18, 2010

(54) SELF-AUTHENTICATING BLADE SERVER IN A SECURE ENVIRONMENT

(75) Inventors: Shane Chiasson, Pflugerville, TX (US); Sompong Paul Olarig, Pleasanton, CA (US); Lee Zaretsky, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 980 days.

(21) Appl. No.: 11/346,793

(22) Filed: Feb. 3, 2006

(65) Prior Publication Data

US 2007/0192604 A1    Aug. 16, 2007

(51) Int. Cl.
*H04L 9/00* (2006.01)
*H04L 9/32* (2006.01)
(52) U.S. Cl. .......................... 713/168; 713/170; 726/2
(58) Field of Classification Search ............... 713/1–2, 713/168, 170, 176, 181; 726/1–7, 16, 17, 726/34, 35
See application file for complete search history.

(56) References Cited

U.S. PATENT DOCUMENTS

| 6,032,257 | A | 2/2000 | Olarig et al. ............... 713/200 |
| 6,324,648 | B1 | 11/2001 | Grantges, Jr. ............... 726/12 |
| 7,024,556 | B1 | 4/2006 | Hadjinikitas et al. ........ 713/168 |
| 7,039,714 | B1 | 5/2006 | Blakley, III et al. ......... 709/229 |
| 7,222,062 | B2 * | 5/2007 | Goud et al. ................... 703/23 |
| 7,353,415 | B2 | 4/2008 | Zaretsky et al. ............. 713/220 |

* cited by examiner

*Primary Examiner*—Hosuk Song
(74) *Attorney, Agent, or Firm*—Baker Botts L.L.P.

(57) ABSTRACT

A blade server module in an information handling system may have secure environment and authorized removal modes in non-volatile memory. If the secure environment mode is set in the blade server module, then the authorized removal mode is read to determine whether it also is set. If both of these modes are set then authentication keys of the inserted blade server module and blade server chassis are verified as being properly associated. If the authorized removal mode is not set when the blade server module is inserted into a server chassis or authentication keys are not verified as being properly associated then the blade server module power-up sequence is disabled. The authentication keys may be administrator/user defined. The secure environment and authorized removal modes may be set and cleared by the administrator/user.

19 Claims, 5 Drawing Sheets

SELF-AUTHENTICATING BLADE SERVER IN A SECURE ENVIRONMENT

TECHNICAL FIELD

The present disclosure relates generally to information handling systems and, more particularly, to information handling systems having self-authenticating blade servers in a secure environment.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system is powered from a power supply system that receives and converts alternating current (AC) power to direct current (DC) power at utilization voltages required by the electronic modules comprising the information handling system. The power supply system tightly regulates these utilization voltages and incorporates over current protection for each of the voltages. To further provide increased reliability of the power supply system, a plurality of power supply units (PSU) may be provided and coupled in parallel so that the loss or malfunction of one or more of the PSUs will not totally disable operation of the information handling system.

As consumer demand increases for smaller and denser information handling systems, manufacturers strive to integrate more computer components into a smaller space. This integration has led to the development of several applications, including high density servers. A high density server provides the computer processing resources of several computers in a small amount of space. A typical arrangement for a high density server includes a shared power supply system, a management module, a connection board (e.g., a back-plane or mid-plane) and server modules, such as blade server modules.

Blade server modules, or "blades," are miniaturized server modules that typically are powered from a common power supply system and are cooled by cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources (e.g., power supplies, cooling systems, enclosures, etc.,) and the reduction of space required by this type of multi-server system while providing a significant increase in available computer processing power.

SUMMARY

Blade servers being physically small and of high dollar value are relatively easy and attractive to steal. A blade server may also contain sensitive company and business information, e.g., customer lists, pricing, etc., that may require high levels of security. A stolen blade server may be placed into another compatible information handling system, thus making that blade server and any data stored therein at risk of discovery by unauthorized personnel. Therefore what is needed is a blade server that is self-aware of its environment and will disable itself, e.g., operation and/or access to any information stored therein in the event that it has been removed from a legitimate host information handling system without proper authorization.

According to a specific example embodiment of this disclosure, an information handing system may comprise a method for self-authenticating a blade server in a secure environment, said method comprising the steps of setting an authentication key into a blade server, setting a secure environment mode in the blade server, receiving a blade management removal signal, setting an authorized removal mode in the blade server after receiving the blade management removal signal, and powering down operation of the blade server. When the powered down blade server is powered back up in the information handling system, the information handing system may determine whether the secure environment mode is set in the blade server, wherein if the secure environment mode is not set then a normal boot-up sequence is performed for the blade server, and if the secure environment mode is set then determining whether the authorized removal mode is set in the blade server, wherein if the authorized removal mode is not set then disabling the boot-up sequence for the blade server, and if the authorized removal mode is set then verifying the authentication key into a blade server, wherein if the authentication key is valid with the information handling system then perform a normal boot-up sequence for the blade server, and if the authentication key is not valid with the information handling system then disable the boot-up sequence for the blade server.

According to another specific example embodiment of this disclosure, an information handing system may comprise at least one blade server, wherein the at least one blade server may store an authentication key, a secure environment mode and an authorized removal mode; wherein the at least one blade server may be adapted to receive the authentication key, set and clear the secure environment mode, and set and clear the authorized removal mode; whereby the authentication key is received, the secure environment mode is set and cleared, and the authorized removal mode is set and cleared when the at least one blade server is operational in an information handling system. The at least one blade server may perform a normal boot-up when installed in an information handling system when the secure environment mode is set, the authorized removal mode is set and the authentication key is verified, otherwise if the secure environment mode is set and either the authorized removal mode is not set or the authentication key is not verified then the boot-up sequence will be disabled. The authentication key may be shared over a plurality of information handling systems and the at least one blade server.

BRIEF DESCRIPTION OF THE DRAWINGS

A more complete understanding of the present disclosure thereof may be acquired by referring to the following description taken in conjunction with the accompanying drawings wherein.

Figure 1:
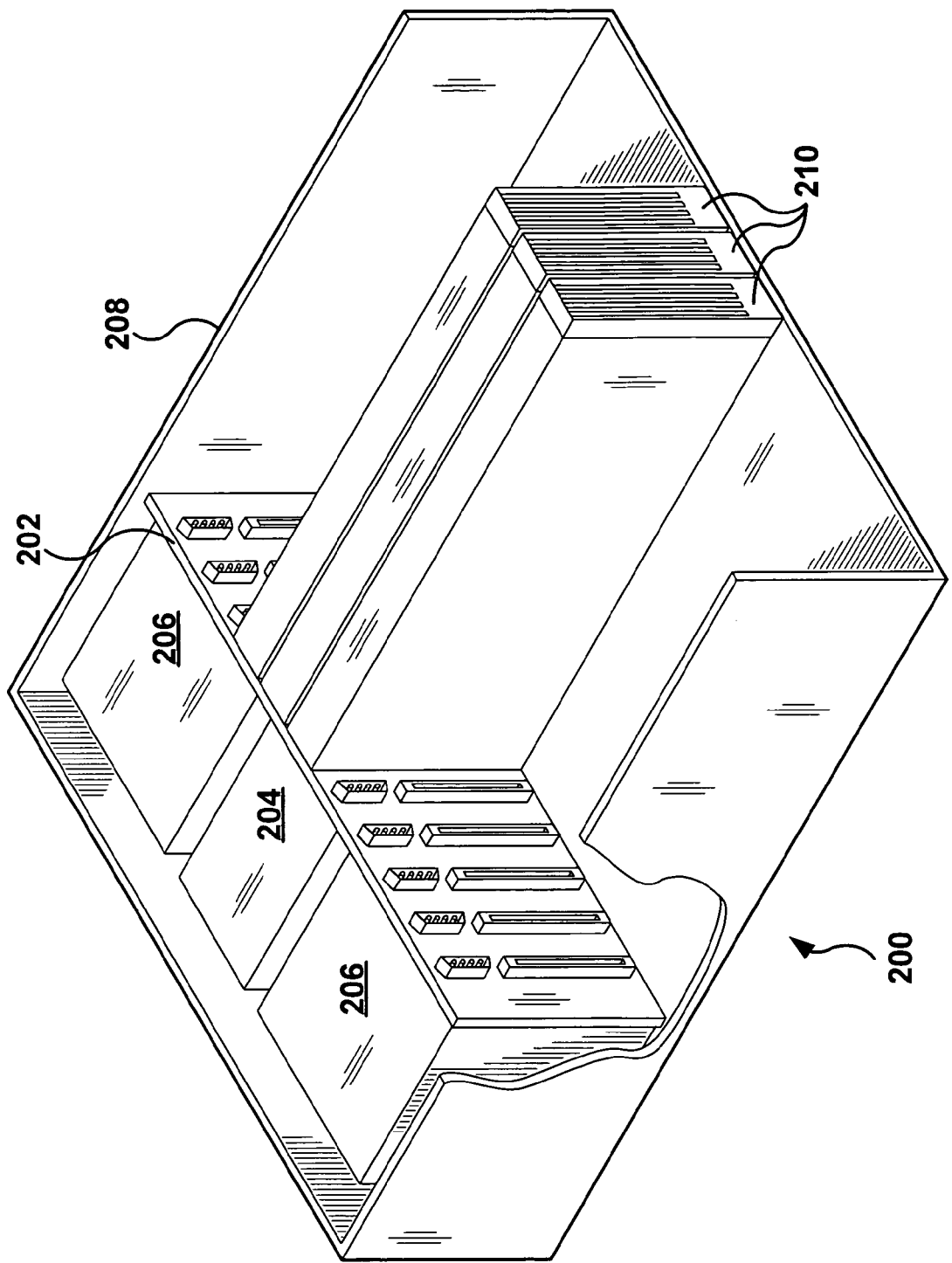
FIG. 1 is a schematic perspective view of a high density information handling blade server system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic perspective view of a high density information handling blade server system, according to a specific example embodiment of the present disclosure. The information handling server system, generally represented by the numeral 200, comprises at least one blade server module (BSM) 210, a power distribution board (PDB) 202, at least one power supply unit (PSU) 206 and a module monitor board (MMB) 204. In certain embodiments, one example of an information handling server system 200 includes a high density server system 200 that may form a part of a component rack system (not expressly shown). Typically, the high density server system 200 may include an enclosure or chassis 208 in which the at least one PSU 206, MMB 204, PDB 202 and the at least one BSM 210 may be enclosed therein. Each BSM 210 may include a blade management controller (BMC) 212 (see FIG. 2).

Although FIG. 1 depicts a mid-plane PDB 202 as being placed between MMB 204 and the at least one BSM 210, the PDB 202 may be located anywhere in the information handling system 200, even external to the chassis 208. In alternate embodiments, the PDB 202 may be located along the back of the information handling server system 200 and may be referred to as a power distribution back-plane (not shown).

The high density server system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BSM 210. Generally, the PSU 206 output is coupled through the PDB 202 for distribution to the at least one BSM 210.

Figure 2:
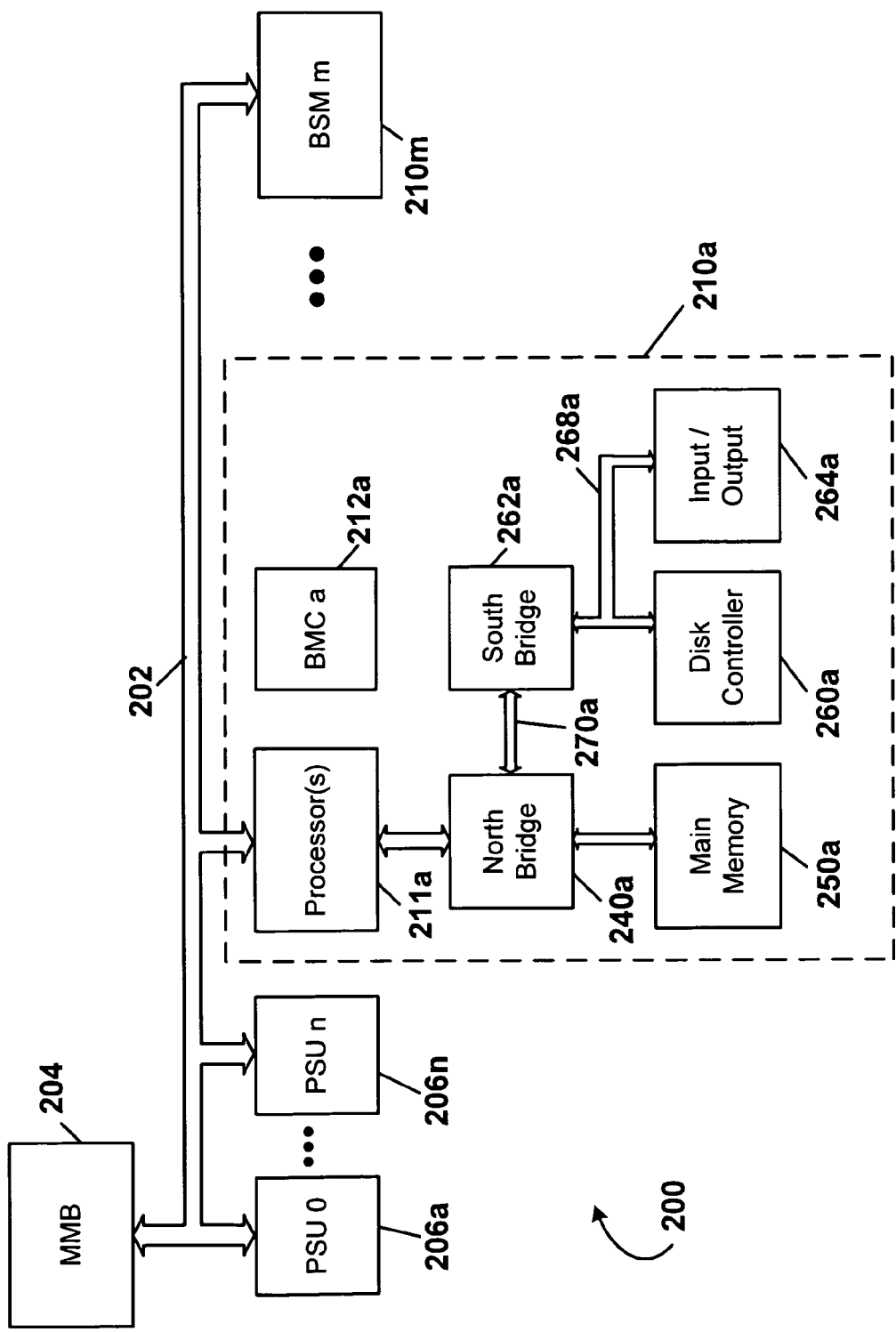
FIG. 2 is an information handling blade server system having electronic components mounted on at least one printed circuit board (PCB) (motherboard not shown) and communicating data and control signals therebetween over signal buses.

Referring to FIG. 2, depicted is an information handling blade server system having electronic components mounted on at least one printed circuit board (PCB) (motherboard not shown) and communicating data and control signals therebetween over signal buses. In one example embodiment, the information handling server system is a computer blade server system. The information handling server system, generally referenced by the numeral 200, may comprise one or more blade server modules (BSMs) 210a-210m. For each of the blade server modules (BSMs) 210a-210m (for illustrative purposes only components for BSM 210a are shown) there may be a processor(s) 211a, a north bridge 240a, which may also be referred to as a memory controller hub or a memory controller that is coupled to a main system memory 250a, and the blade management controller (BMC) 212a. The north bridge 240a is coupled to the processor(s) 210a via the host bus 220a. The north bridge 240a is generally considered an application specific chip set that provides connectivity to various buses, and integrates other system functions such as a memory interface. For example, an Intel 820E and/or 815E chip set, available from the Intel Corporation of Santa Clara, California, provides at least a portion of the north bridge 240a. The chip set may also be packaged as an application specific integrated circuit (ASIC). The north bridge 240a typically includes functionality to couple the main system memory 250a to other devices within the information handling system 100. Thus, memory controller functions such as main memory control functions typically reside in the north bridge 240a. In addition, the north bridge 240a provides bus control to handle transfers between the host bus 220a and a second bus(es), e.g., PCI bus 270a. A third bus(es) 268a may also comprise other industry standard buses or proprietary buses, e.g., ISA, SCSI, I$^2$C, SPI, USB buses through a south bridge(s) (bus interface) 262a.

According to teachings of this disclosure, a BSM 210 may contain authentication key and status settings to monitor and control its security status. A user/administrator may set an authentication key at the blade server chassis level that may also be downloaded to each of the BSMs 210 associated with the blade server chassis, e.g., chassis 208. This authentication key may be shared at the corporate, departmental and/or user group levels. The BSM 210 may contain security status settings that may be stored in each BSM 210's local non-volatile memory, e.g., electrically erasable and programmable read only memory (EEPROM), Flash memory, etc. One security status setting may indicate that the BSM 210 may be operating in a secure environment, while another security status setting may indicate if removal of the BSM 210 has been authorized.

Each time a BSM 210 powers-up it may check these security status settings. If a secure environment mode is set, then the BSM 210 will check if the authorized removal mode is set. If the BSM 210 has been authorized for removal it will read an authentication number associated with the information handling system 200. If the authentication number stored in the BSM 210 and the authentication number read from the information handling system 200 match, then the BSM 210 will enable itself to boot-up for normal operation thereafter. If these two authentication numbers do not match or the security status indicates that the BSM 210 was not authorized for removal, then the BSM 210 will disable itself from operationally booting up. Thus a BSM 210 may be moved to any chassis 208 within a workgroup and/or departmental level while still maintaining full functionality with security.

It is contemplated and within the scope of this disclosure that a trusted platform module (TPM) and/or digital signatures may be used to support authentication key storage. Depending on the information handling system, blade security as disclosed herein may be extended to use digital signatures, e.g., public and private key, encryption and decryption, hash codes, etc.

Figure 3:
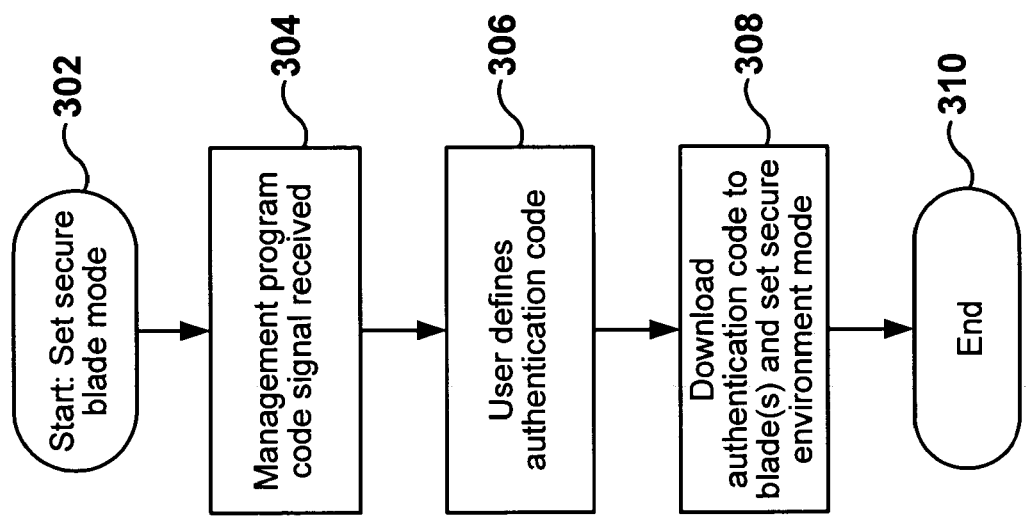
FIG. 3 is a schematic flow diagram of a sequence of steps for setting the security mode of a blade server, according to a specific example embodiment of the present disclosure.

Referring now to FIG. 3, depicted is a schematic flow diagram of a sequence of steps for setting the security mode of a blade server, according to a specific example embodiment of the present disclosure. Step 302 starts the process of setting up the secure blade mode. In step 304, a management program code signal is received, and in step 306 a user/administrator defines an authentication key. In step 308 this authentication key is downloaded to each BSM 210 of a defined group and each of these BSMs 210 is set to a secure environment mode. After each of the BSMs 210 is set to the secure environment mode, step 310 ends setup of the security mode activity.

Figure 4:
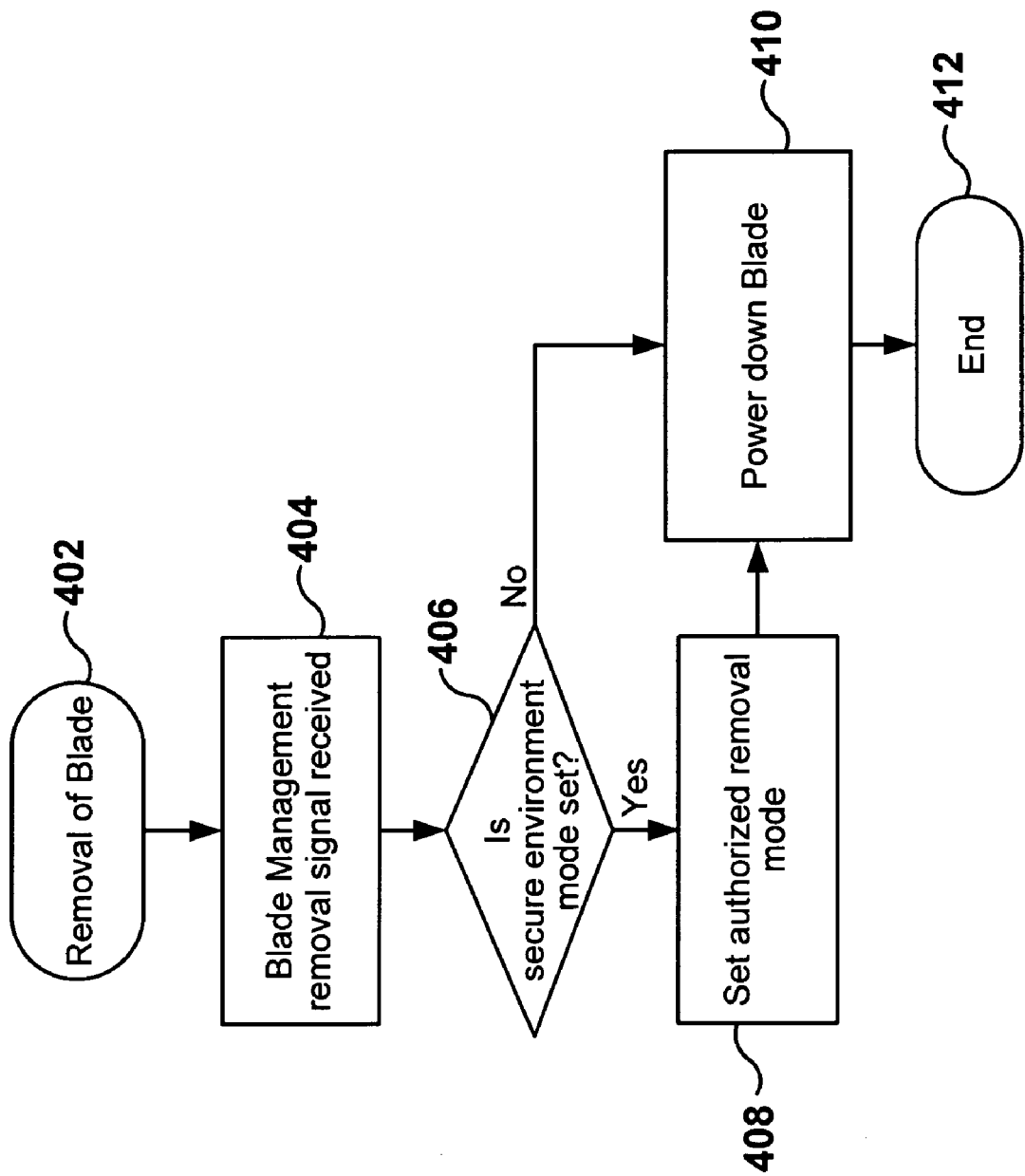
FIG. 4 is a schematic flow diagram of a sequence of steps for removing a secure blade server, according to a specific example embodiment of the present disclosure.

Referring now to FIG. 4, depicted is a schematic flow diagram of a sequence of steps for removing a secure blade server, according to a specific example embodiment of the present disclosure. When a BSM 210 being is removed in step 402, it causes a blade management removal signal to be received in step 404. Upon receipt of the blade management removal signal in step 404, step 406 determines whether the BSM 210 was set to a secure environment mode before being removed. If the secure environment mode was set then in step 408 in the BSM 210 is set to an authorized removal mode before being removed. Then in step 410 the BSM 210 is powered down. However, if the secure environment mode was not set then the authorized removal mode is not set in the BSM 210 being removed and in step 410 the BSM 210 is powered down. After the BSM 210 has powered down in step 410, step 412 ends the secure blade server removal activity.

Figure 5:
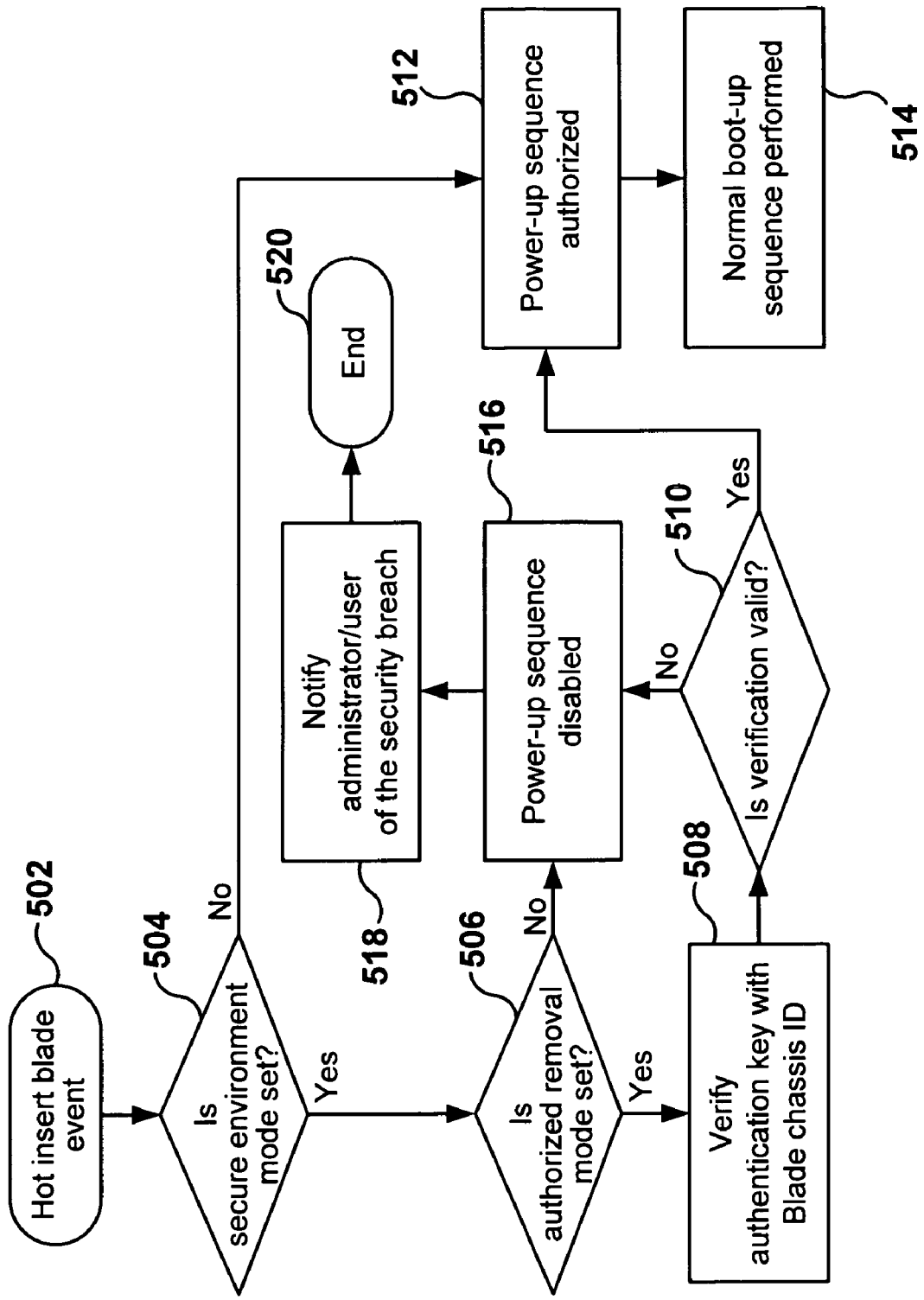
FIG. 5 is a schematic flow diagram of a sequence of steps for inserting a secure blade server, according to a specific example embodiment of the present disclosure.

Referring now to FIG. 5, depicted is a schematic flow diagram of a sequence of steps for inserting a secure blade server, according to a specific example embodiment of the present disclosure. In step 502 the BSM 210 may be hot inserted into an information handling system 200. After the BSM 210 has been inserted during step 502, step 504 determines whether the secure environment mode is set in the inserted BSM 210. If the secure environment mode is not set in the inserted BSM 210 then a power-up sequence is authorized in step 512, and a normal boot-up sequence is performed in step 514.

However, if the secure environment mode is set in the inserted BSM 210 then step 504 determines whether the authorized removal mode was set in the inserted BSM 210. If the authorized removal mode is not set in the inserted BSM 210, then step 516 disables the BSM 210 power-up sequence. Then step 518 notifies a system administrator/user of a security breach of a BSM 210 that was removed without proper authorization then hot inserted back into an information handling system 200. After the notification in step 518, the secure blade server insertion activity ends in step 520.

If the authorized removal mode is set in the inserted BSM 210, then step 508 verifies authentication keys of the inserted BSM 210 and the blade chassis 208. Step 510 determines whether the verification from step 508 is valid, e.g., both the BSM 210 and chassis 208 authentication keys properly correlate together as previously defined by a system administrator and/or user. If both authentication keys are verified as proper in step 510, then the power-up sequence is authorized in step 512, and a normal boot-up sequence is performed in step 514. However, if either authentication key is not verified as proper in step 510, then the power-up sequence is disabled in step 516. The step 518 notifies a system administrator/user of a security breach of a BSM 210 that was removed without proper authorization then hot inserted back into an information handling system 200. After the notification in step 518, the secure blade server insertion activity ends in step 520.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for self-authenticating a blade server in a secure environment, said method comprising the steps of:
    powering up the blade server in an information handling system;
    determining whether the secure environment mode is set in the blade server, wherein:
        if the secure environment mode is not set then performing a normal boot-up sequence for the blade server, and
        if the secure environment mode is set then;
    determining whether the authorized removal mode is set in the blade server, wherein
        if the authorized removal mode is not set then disabling the boot-up sequence for the blade server, and
        if the authorized removal mode is set then;
    verifying the authentication key into a blade server, wherein
        if the authentication key is valid with the information handling system then perform a normal boot-up sequence for the blade server, and if the authentication key is not valid with the information handling system then disable the boot-up sequence for the blade server;

setting an authentication key into a blade server;

setting a secure environment mode in the blade server;

receiving a blade management removal signal;

setting an authorized removal mode in the blade server after receiving the blade management removal signal; and powering down operation of the blade server.

2. The method according to claim 1, further comprising the step of notifying an administrator of a security breach whenever the boot-up sequence for the blade server is disabled.

3. The method according to claim 1, further comprising the step of notifying a user of a security breach whenever the boot-up sequence for the blade server is disabled.

4. The method according to claim 1, wherein the authentication key is programmable.

5. The method according to claim 1, wherein the authentication key is a digital signature.

6. The method according to claim 1, wherein the authentication key is an information handling system authentication number.

7. The method according to claim 1, wherein the steps of setting and verifying the authentication key further comprise the steps of encrypting and un-encrypting the authentication key, respectively.

8. The method according to claim 1, wherein the steps of setting and verifying the authentication key further comprise the steps of coding and decoding the authentication key, respectively.

9. The method according to claim 8, wherein the steps of coding and decoding the authentication key are done with a digital signature public encryption key and a digital signature private decryption key, respectively.

10. The method according to claim 8, wherein the steps of coding and decoding the authentication key are done with a secure code.

11. The method according to claim 8, wherein the steps of coding and decoding the authentication key are done with a trusted platform module (TPM).

12. The method according to claim 1, wherein the authentication key, the secure environment mode and the authorized removal mode are stored in a non-volatile memory of the blade server.

13. The method according to claim 12, wherein each of the plurality of blade servers stores the respective authentication key, the secure environment mode and the authorized removal mode in a non-volatile memory.

14. The method according to claim 1, further comprising a plurality of blade servers, each one of the plurality of blade servers adapted for storing a respective authentication key, secure environment mode and authorized removal mode, wherein the authentication key, the secure environment mode and the authorized removal mode for each of the plurality of blade servers are individually set and tested.

15. An information handling system, comprising:

at least one blade server, wherein the at least one blade server stores an authentication key, a secure environment mode and an authorized removal mode;

wherein the at least one blade server is adapted to receive the authentication key, set and clear the secure environment mode, and set and clear the authorized removal mode;

whereby the authentication key is received, the secure environment mode is set and cleared, and the authorized removal mode is set and cleared when the at least one blade server is operational in an information handling system; and wherein the at least one blade server will perform a normal boot-up when installed in an information handling system when the secure environment mode is set, the authorized removal mode is set and the authentication key is verified, otherwise if the secure environment mode is set and either the authorized removal mode is not set or the authentication key is not verified then the boot-up sequence will be disabled.

16. The information handling system according to claim 15, wherein the authentication key is created by an administrator, the secure environment mode and the authorized removal mode are each set and cleared by the administrator.

17. The information handling system according to claim 15, wherein the authentication key is created by an administrator, and the secure environment mode and the authorized removal mode are each set and cleared by a user.

18. The information handling system according to claim 15, wherein when a blade management removal signal is received and the secure environment mode is set then the authorized removal mode is set.

19. The information handling system according to claim 15, wherein the authentication key may be shared with a plurality of information handling systems and the at least one blade server.

* * * * *